US011294428B2

(12) United States Patent
Tsai et al.

(10) Patent No.: US 11,294,428 B2
(45) Date of Patent: *Apr. 5, 2022

(54) ELECTRONIC DEVICE WHICH CAN DETECT TOUCH STATE

(71) Applicant: PixArt Imaging Inc., Hsin-Chu (TW)

(72) Inventors: Ming-Hung Tsai, Hsin-Chu (TW);
Tse-Chung Su, Hsin-Chu (TW);
Ren-Hau Gu, Hsin-Chu (TW);
Tzung-Min Su, Hsin-Chu (TW)

(73) Assignee: Pix Art Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,523

(22) Filed: Apr. 18, 2021

(65) Prior Publication Data
US 2021/0240220 A1    Aug. 5, 2021

Related U.S. Application Data

(63) Continuation of application No. 16/748,746, filed on Jan. 21, 2020, now Pat. No. 11,016,535.

(51) Int. Cl.
G06F 1/16     (2006.01)
G06F 3/041    (2006.01)
G06F 3/044    (2006.01)

(52) U.S. Cl.
CPC .............. G06F 1/163 (2013.01); G06F 3/044 (2013.01); G06F 3/0412 (2013.01)

(58) Field of Classification Search
CPC ......... G06F 1/163; G06F 3/044; G06F 3/0412
See application file for complete search history.

(56) References Cited

U.S. PATENT DOCUMENTS

| | | |
|---|---|---|
| 2013/0085538 A1 | 4/2013 | Volpe |
| 2017/0307414 A1 | 10/2017 | Ferri |
| 2018/0150126 A1 | 5/2018 | Xu |
| 2018/0202840 A1 | 7/2018 | Cho |
| 2019/0253155 A1 | 8/2019 | Shoji |

Primary Examiner — Muhammad N Edun
(74) Attorney, Agent, or Firm — Winston Hsu

(57) ABSTRACT

An electronic device which can detect a touch state, comprising: a front surface for showing images; at least one first electrode, provided in a first region; at least one second electrode, provided in a second region, wherein a distance between the first region and the front surface is larger than a distance between the second region and the front surface; a capacitance calculating circuit, configured to calculate at least one first capacitance generated by the first electrode and coupled to the second electrode to calculate at least one second capacitance generated by the second electrode, wherein the capacitance calculating circuit further calculates a capacitance difference between the first capacitance and the second capacitance; and a processing circuit, configured to determine the touch state according to the capacitance difference. Via such structure, the touch state of the electronic device can be precisely acquired.

7 Claims, 7 Drawing Sheets

ELECTRONIC DEVICE WHICH CAN DETECT TOUCH STATE

CROSS REFERENCE TO RELATED APPLICATIONS

This application is a continuation of applicant's earlier application, Ser. No. 16/748,746, filed 2020 Jan. 21, and is included herein by reference.

BACKGROUND OF THE INVENTION

1. Field of the Invention

The present invention relates to an electronic device capable of detecting a wearing state or a touching state, and particularly relates to an electronic device having at least one electrode to detect a wearing state or a touching state.

2. Description of the Prior Art

In recent years, a smart wearable electronic device such as a smart watch or a smart wristband has become more and more popular. Such smart wearable electronic device always has various functions, such as mobile payment or biological information detection (e.g. heart rate). However, the biological information detection may fail or non-accurate if the user does not wear the smart wearable electronic device in a proper manner. Also, the smart wearable electronic device always needs to be recognized before using the mobile payment. If the smart wearable electronic device is stolen after being recognized, someone who steals it can use this device to pay any bill. However, no security mechanism is provided to avoid such issue.

SUMMARY OF THE INVENTION

One objective of the present invention is to provide an electronic device with a function of detecting a touch state.

One embodiment of the present invention provides an electronic device with a function of detecting a touch state, comprising: a front surface, configured to show images; at least one first electrode, provided in a first region of the electronic device; at least one second electrode, provided in a second region of the electronic device, wherein a distance between the first region and the front surface is larger than a distance between the second region and the front surface; a capacitance calculating circuit, coupled to the first electrode to calculate at least one first capacitance generated by the first electrode and coupled to the second electrode to calculate at least one second capacitance generated by the second electrode, wherein the capacitance calculating circuit further calculates a capacitance difference between the first capacitance and the second capacitance; and a processing circuit, coupled to the capacitance calculating circuit, configured to determine the touch state according to the capacitance difference.

In view of above-mentioned embodiment, a touch state of the electronic device can be detected via electrodes of the electronic device.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, a plurality of embodiments are provided to explain the concept of the present invention. Please note the components in following embodiments can be implemented by hardware (e.g. circuit or device), or implemented by firmware (e.g. a processor installed with at least one program). Also, the components in each embodiment can be integrated to fewer components, or be divided to more components. Furthermore, the terms "first", "second" . . . in following embodiments are only for defining different components, steps or parameters, but do not mean to limit the sequences thereof.

Additionally, in following embodiments, a smart watch is taken as an example to explain the concepts of the present invention. However, the wearable electronic device is not limited to a smart watch. Furthermore, the concept disclosed by the present invention can be applied any other kind of electronic device to detect a touch state or a wearing state of the electronic device rather than limited to a wearing state of a wearable electronic device.

Figure 1:
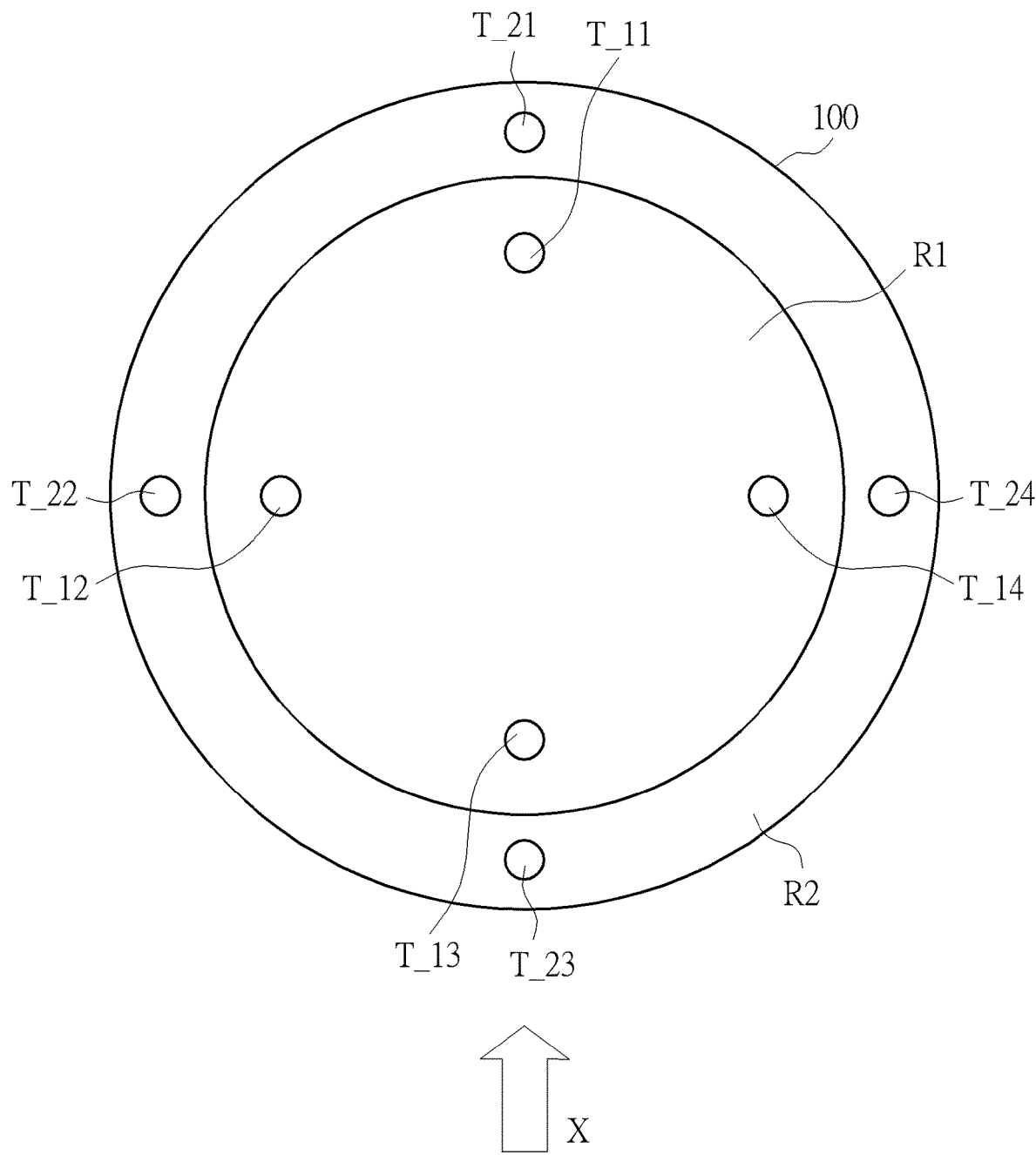
FIG. 1 is a schematic diagram illustrating a wearable electronic device according to one embodiment of the present invention.
Figure 2:
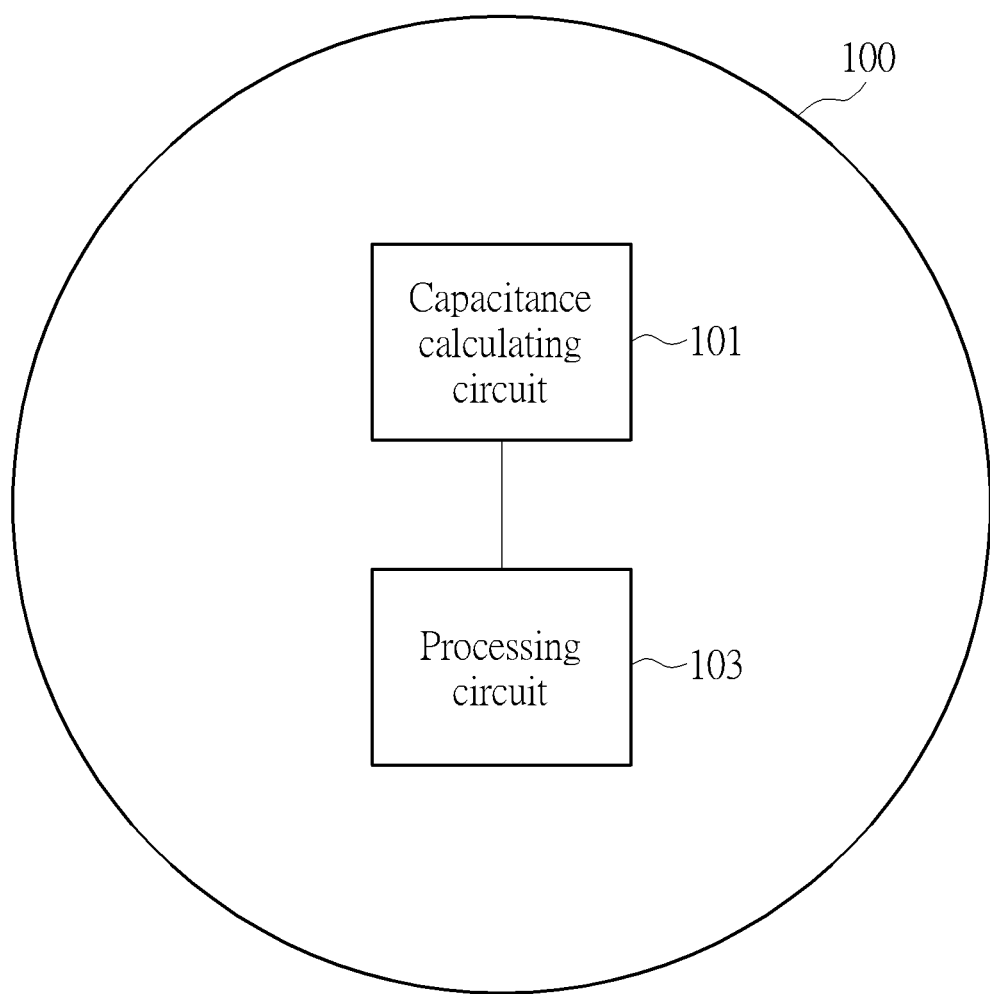
FIG. 2 is a block diagram illustrating the wearable electronic device illustrated in FIG. 1 according to one embodiment of the present invention.

FIG. 1 is a schematic diagram illustrating a wearable electronic device according to one embodiment of the present invention. Further, FIG. 2 is a block diagram illustrating the wearable electronic device illustrated in FIG. 1 according to one embodiment of the present invention. Please refer to FIG. 1 and FIG. 2 simultaneously to understand the present invention for more clear.

As illustrated in FIG. 1, the wearable electronic device 100 comprises at least one first electrode $T\_11$, $T\_12$, $T\_13$, $T\_14$ and at least one second electrode $T\_21$, $T\_22$, $T\_23$ and $T\_24$. The first electrodes $T\_11$, $T\_12$, $T\_13$, $T\_14$ are provided in a first region R1 of the wearable electronic device 100, and the second electrodes $T\_21$, $T\_22$, $T\_23$ and $T\_24$ are provided in a second region R2 of the wearable electronic device 100.

In one embodiment, the first region R1 and the second region R2 are provided at a back side of the wearable electronic device 100. The first region R1 and the second region R2 are not on the same plane, and the first region R1 relatively protrudes from a front surface of the wearable electronic device 100 than the second region R2. Accordingly, when a user wears the wearable electronic device 100, a distance between the user's skin (i.e. a surface to be detected) and the first region R1 is smaller than a distance between the user's skin and the second region R2. Accordingly, the second region R2 may not touch the user's skin when the first region R1 touches the user's skin.

Further, as illustrated in FIG. 2, the wearable electronic device 100 comprises a capacitance calculating circuit 101 and a processing circuit 103 provided in the wearable electronic device 100. The capacitance calculating circuit 101 is coupled to the first electrodes T_11, T_12, T_13, T_14 to calculate at least one first capacitance generated by the first electrodes T_11, T_12, T_13, T_14 and coupled to the second electrodes T_21, T_22, T_23 and T_24 to calculate at least one second capacitance generated by the second electrodes T_21, T_22, T_23 and T_24. The capacitance calculating circuit 101 further calculates a capacitance difference between the first capacitance and the second capacitance. The processing circuit 103 is coupled to the capacitance calculating circuit 101, and is configured to determine the wearing state according to the capacitance difference.

The first electrodes T_11, T_12, T_13, T_14 and at least one second electrodes T_21, T_22, T_23 and T_24 are provided in the wearable electronic device 100 and at least part of the them expose on the back side of the wearable electronic device 100. In one embodiment, protecting materials are provided to the part of the first electrodes T_11, T_12, T_13, T_14 and the second electrodes T_21, T_22, T_23 and T_24 which expose on the back side, but the user can still cause capacitance variation while indirectly touching the part. In the embodiment of FIG. 1, the wearable electronic device 100 comprises an inner region serving as the first region R1 and an outer region serving as the second region R2 surrounding the first region R1. Further, in one embodiment, a user's skin does not touch the second region R2 while the user wearing the wearable electronic device.

Figure 3:
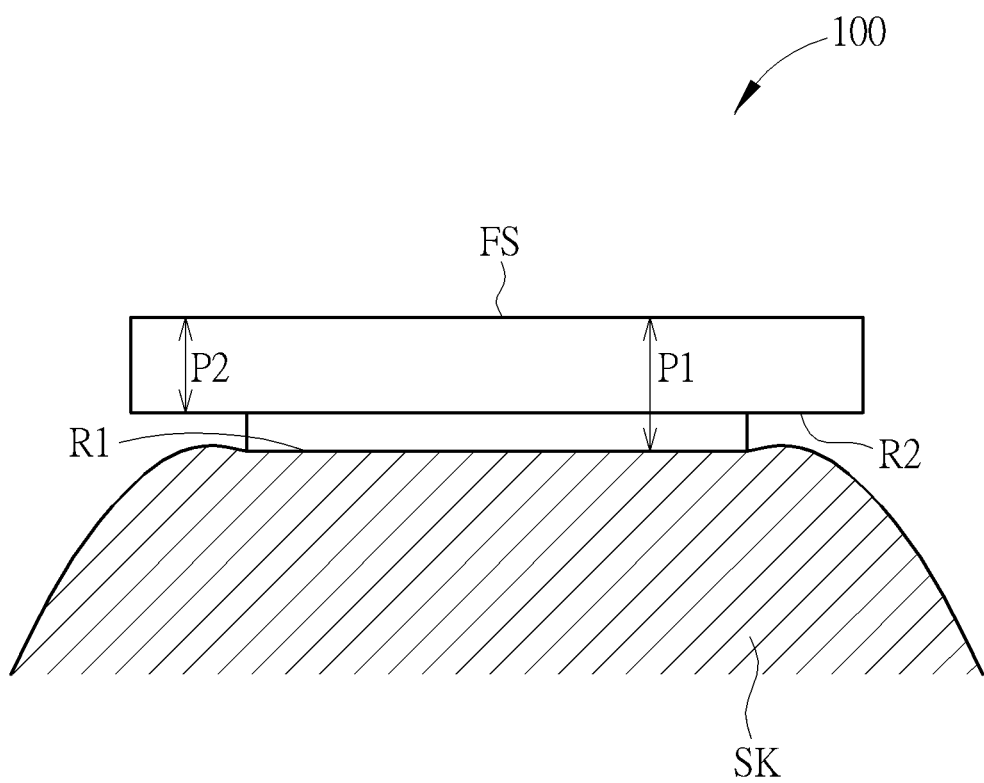
FIG. 3 is a schematic diagram illustrating locations of the first electrode and the second electrode according to one embodiment of the present invention.

FIG. 3 is a schematic diagram illustrating locations of the first electrode and the second electrode according to one embodiment of the present invention, which is a diagram of FIG. 1 viewed in the X direction. As illustrated in FIG. 3, the wearable electronic device 100 is a smart watch and the first region R1, the second region R2 are provided on a back side of the wearable electronic device 100. Further, the user's skin SK usually does not touch the second region R2 when the user wears the wearable electronic device 100. In other words, the first region R1 and the second region R2 are provided on a backside of the wearable electronic device 100. A thickness P1 between the first region R1 and a front surface FS of the wearable electronic device 100 is greater than a thickness P2 between the second region R2 and the front surface FS of the wearable electronic device 100. Namely, the first part P1 protrudes from the second part P2. In this embodiment, the first region R1 is surrounded by the second region R2.

Accordingly, when a user wears the wearable electronic device 100, a distance between the user's skin and the first region R1 is smaller than a distance between the user's skin and the second region R2. Also, as above-mentioned, the wearable electronic device 100 can be a smart watch, therefore the wearable electronic device 100 comprises the front surface FS, which can show desired information such as images or messages. Further, in the embodiment of FIG. 3, the first region R1, which is provided at a back side of the wearable electronic device 100, comprises a sensing surface. Via the sensing surface, the user can cause capacitance variation to the first electrodes T_11-T_14 when the user wears the wearable electronic device 100. In one embodiment, the user can cause capacitance variation to the second electrodes T_21-T_24 when the user wears the wearable electronic device 100, even if the second electrodes T_21-T_24 do not touch the user. However, the capacitance variation which the user causes to the second electrodes T_21-T_24 may be much smaller than the capacitance variation which the user causes to the first electrodes T_11-T_14 while wearing the wearable electronic device 100.

Therefore, in such embodiment, the first capacitance generated by the first electrodes T_11, T_12, T_13, T_14 when the user wears the wearable electronic device 100 (a worn state) and the first capacitance when the user does not wear the wearable electronic device 100 are different (a taken off state). Also, the second capacitance generated by the second electrodes T_21, T_22, T_23 and T_24 for the worn state and the second capacitance for the taken off state are the same or has a smaller capacitance variation. Accordingly, the capacitance difference between the first capacitance and the second capacitance for the worn state and the capacitance difference between the first capacitance and the second capacitance for the taken off state are also different. Thence, the processing circuit 103 can determine the wearing state according to the capacitance difference between the first capacitance and the second capacitance. In one embodiment, the worn state can mean the user wear the wearable electronic device 100 in a proper manner and the taken off state mean the user wear the wearable electronic device 100 in an improper manner.

In one embodiment, the wearing state comprises the above-mentioned worn state and the above-mentioned taken off state. The processing circuit 103 determines the wearing state is the worn state if the capacitance difference between the first capacitance and the second capacitance is larger than a capacitance difference threshold, and determines the wearing state is the taken off state if the capacitance difference between the first capacitance and the second capacitance is smaller than the capacitance difference threshold In one embodiment, the processing circuit 103 can further control the wearable electronic device 100 according to the wearing state. For example, if the processing circuit 103 detects the wearable electronic device 100 is recognized by the user (e.g. by password or finger print) in the worn state, the processing circuit 103 may switch the wearable electronic device 100 from a recognized state to a non-recognized state when the wearable electronic device 100 changes from the worn state to the taken off state. If the user needs the wearable electronic device 100 to enter the recognized state again in the non-recognized state, the user must be recognized one more time. Briefly, the wearable electronic device 100 cannot be used to pay after the user has been recognized in the worn state and then takes off the wearable electronic device 100. By this way, it can be prevented that the wearable electronic device 100 is stolen and used to pay after the user has been recognized by the wearable electronic device 100 while wearing it.

In another embodiment, the user's skin SK touches only partial of the second region R2 when the user wears the wearable electronic device 100. Therefore, the first capacitance and the second capacitance are different for the worn state and for the taken off state. In such case, the capacitance difference between the first capacitance and the second capacitance for the worn state and the capacitance difference between the first capacitance and the second capacitance for the taken off state are still different. Therefore, the processing circuit 103 can determine the wearing state according the capacitance difference.

Figure 4:
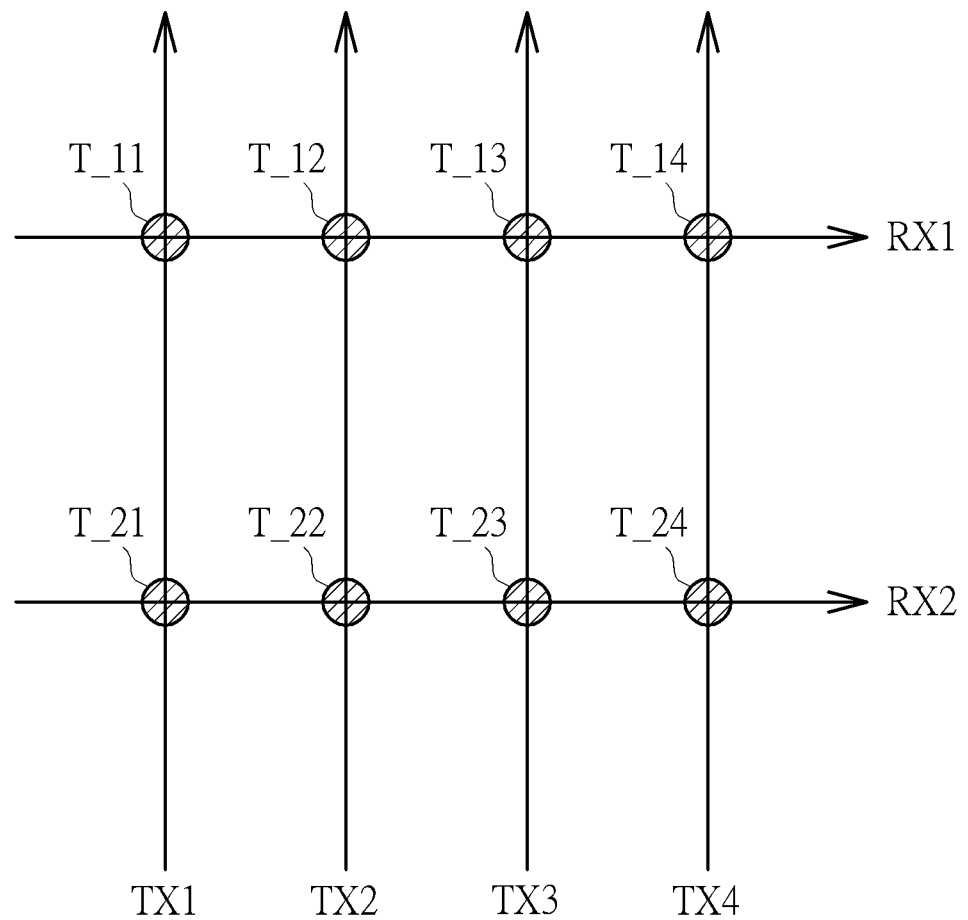
FIG. 4 and FIG. 5 are schematic diagrams illustrating operations of the wearable electronic device illustrated in FIG. 1 according to different embodiments of the present invention.
Figure 5:
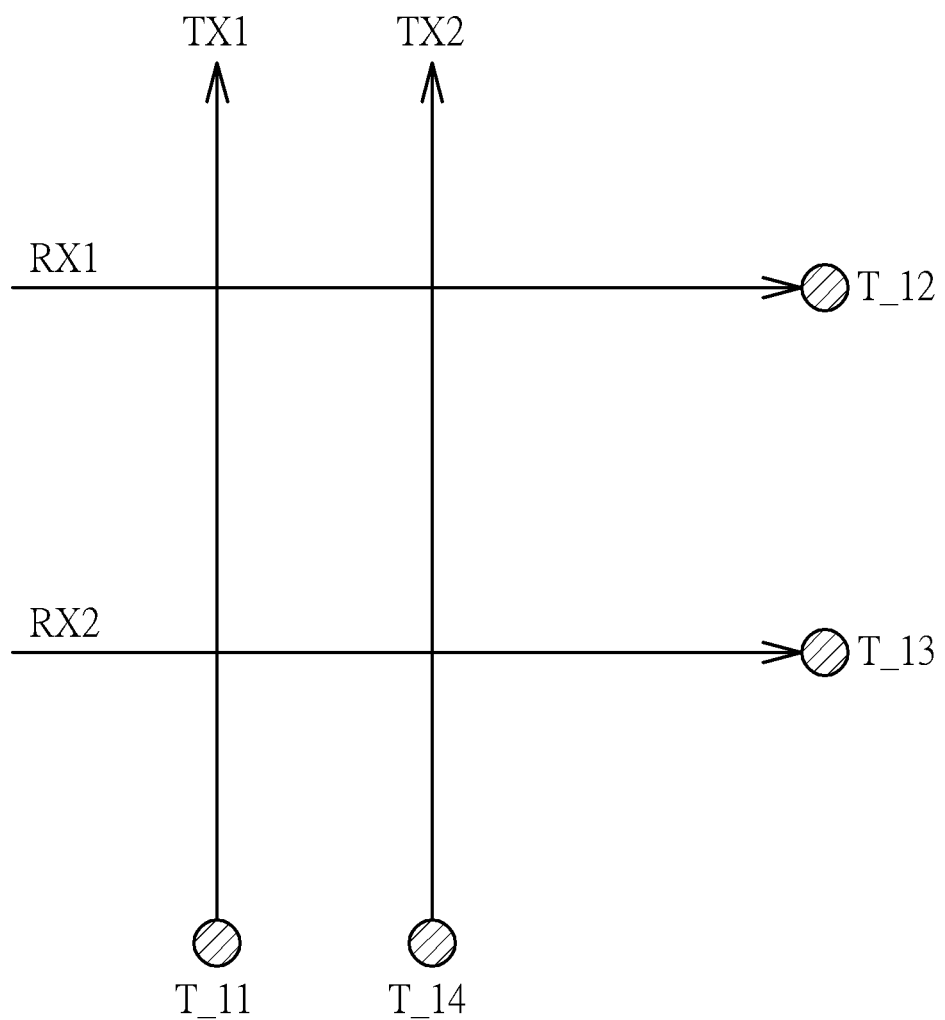

FIG. 4 and FIG. 5 are schematic diagrams illustrating operations of the wearable electronic device illustrated in FIG. 1 according to different embodiments of the present invention. However, FIG. 4 and FIG. 5 are only examples for explaining and do not mean to limit the scope of the present invention.

As illustrated in FIG. 4, the first electrodes T_11-T_14 are served as non-direct contactors for transmitters TX1-TX4 and the receiver RX1. Non-direct contactors mean the first electrodes T_11-T_14 are not coupled to the transmitters TX1-TX4 and the receiver RX1, but the user can still cause change of the electric field or the capacitance between the transmitters TX1-TX4 and the receiver RX1 when the user's skin touches or approaches one of the first electrodes T_11-T_14. For example, if the user touches T_11, the reading result from the receiver RX1 will be altered when a driving signal is provided from the transmitter TX1.

Via respectively providing driving signals to the transmitters TX1-TX4 at different timings, the receiver RX1 can correspondingly generate touch sensing signals at different timings. By this way, the first capacitance generated by the first electrodes T_11-T_14 can be calculated at different timings. Similarly, the second electrodes T_21-T_24 are served as non-direct contactors for the transmitters TX1-TX4 and the receiver RX2. Via respectively providing driving signals to the transmitters TX1-TX4 at different timings, the receiver RX2 can generate touch sensing signals at different timings. By this way, the second capacitance generated by the second electrodes T_21-T_24 can be calculated at different timings. The driving signal can be provided the capacitance calculating circuit 101 illustrated in FIG. 2.

In such structure, via respectively providing driving signals to different transmitters at different timings, the receiver can correspondingly generate touch sensing signals at different timings. By this way, the first capacitance generated by the first electrodes T_11-T_14 and the second capacitance generated by the second electrodes T_21-T_24 can be calculated at different timings.

As illustrated in FIG. 5, in another embodiment, the first electrode T_11 serves as a transmitter TX1. Further, the first electrodes T_12, T_13 respectively serves as receivers RX1, RX2, to generate touch sensing signals corresponding to the electric field generated by the first electrode T_11. The electric fields generated by the first electrode T_11 are different for the worn state and the taken off state, thus the first capacitances generated by the first electrodes T_11, T_12 and T_13 are different for the worn state and the taken off state. The first electrode T_14 can also follow the same rule. Accordingly, via respectively providing driving signals to the first electrodes T_13 and T_14 at different timings, the first capacitances of the first electrodes T_11-T_14 can be calculated. The second electrodes T_21-T_24 can use the mechanism illustrated in FIG. 5 as well. Also, in the embodiment of FIG. 5, the processing circuit 103 can further calculate biological information according to signals (e.g. the above-mentioned electric field) flowing between the transmitter and the receiver.

In one embodiment, a wearing posture including a wearing location and a wearing angle can further be determined by the first capacitances or the second capacitances. Please refer back to FIG. 3, the wearing location can mean a relative location between the first region R1 and the skin SK, and the wearing angle can mean the relative angle between the first region R1 and the skin SK. Different wearing angles or different locations may cause different first capacitance and/or the second capacitance variation. Therefore, the processing circuit 103 can determine the wearing location or the wearing angle according to the first capacitance variation and/or the second capacitance variation. In one embodiment, such as the embodiment illustrated in FIG. 6, the wearable electronic device 100 further comprises a light sensing device 601 configured to generate at least one light sensing signal. The processing circuit 103 calibrates the light sensing signal according to the wearing location or the wearing angle. The light sensing device 601 can be configured to sense the biological information such as heart rate.

Figure 6:
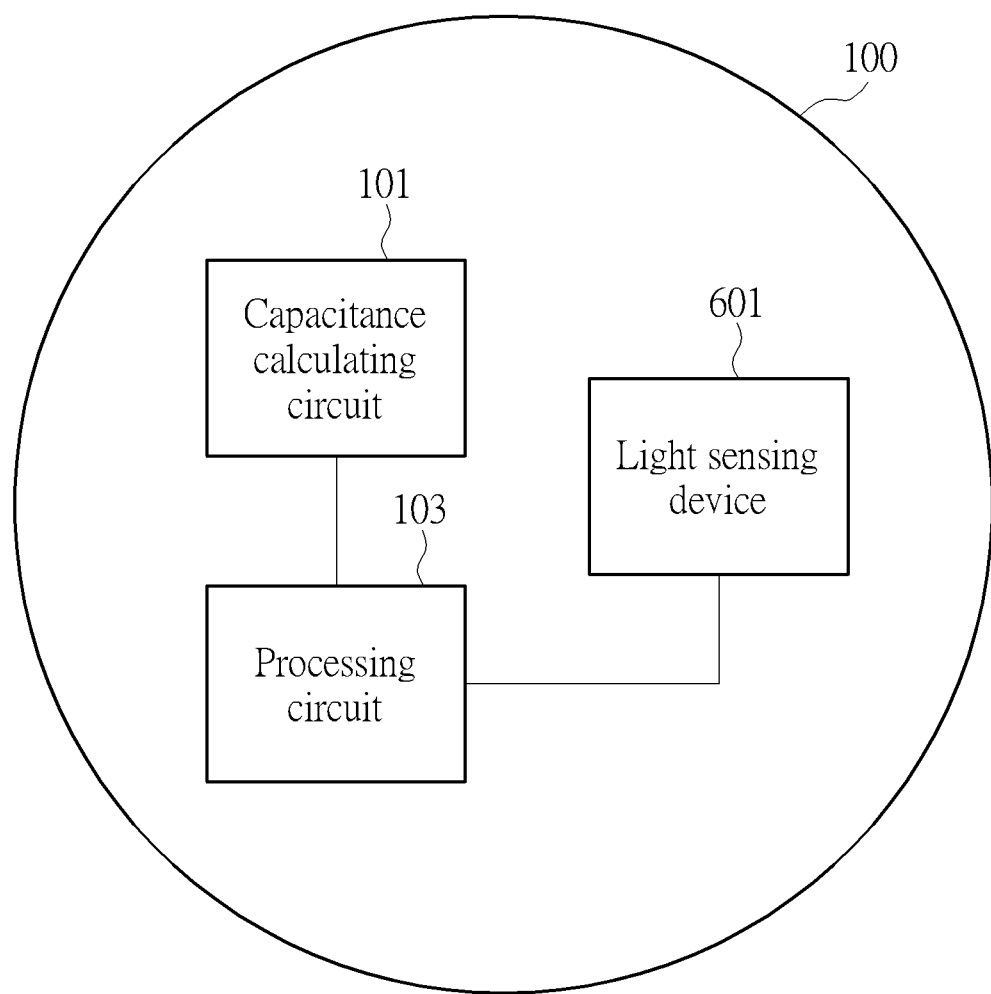
FIG. 6 is a block diagram illustrating the wearable electronic device illustrated in FIG. 1 according to another embodiment of the present invention.
Figure 7:
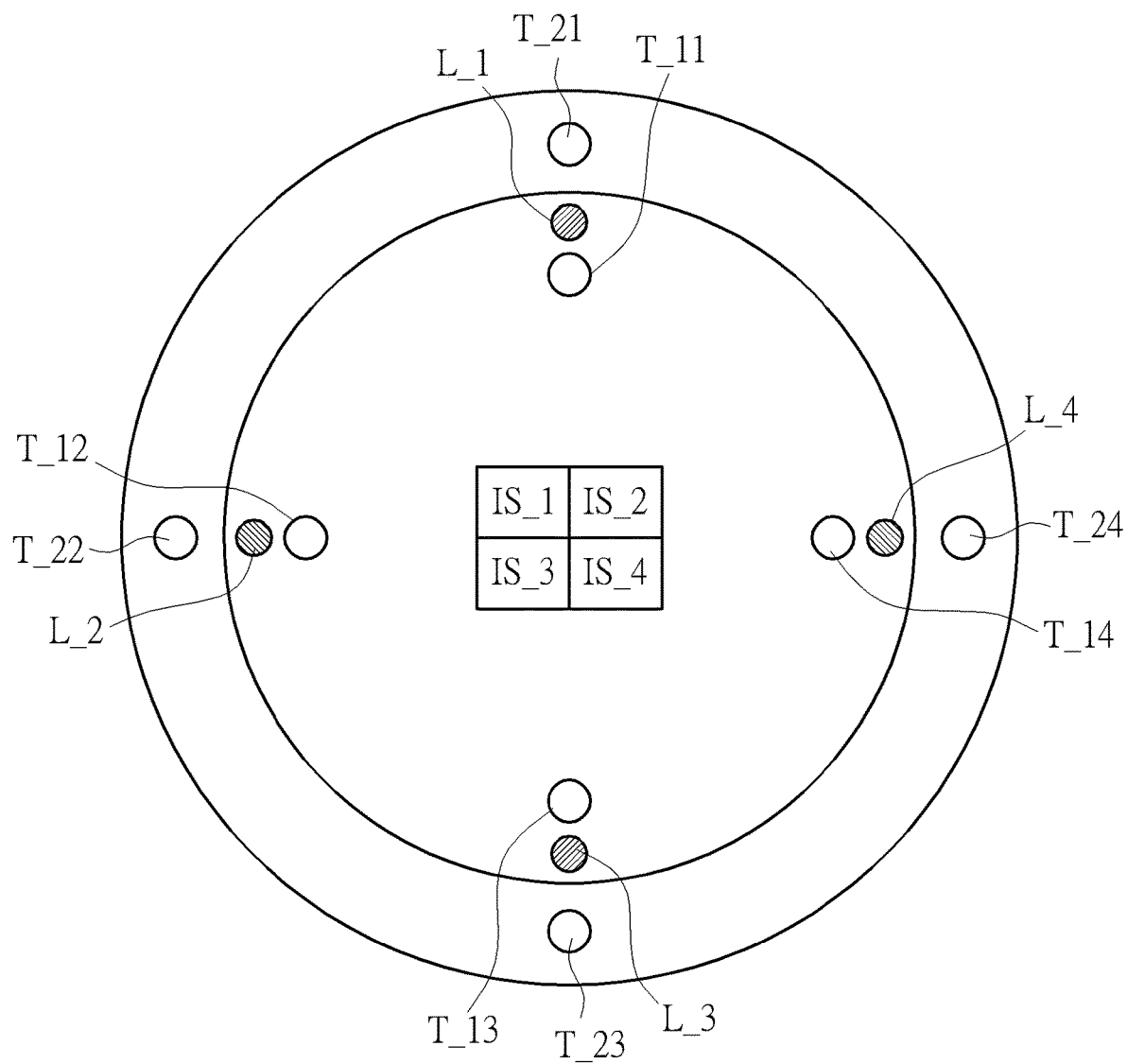
FIG. 7 is a schematic diagram illustrating a wearable electronic device corresponding to the embodiment illustrated in FIG. 6.

FIG. 7 is a schematic diagram illustrating a wearable electronic device corresponding to the embodiment illustrated in FIG. 6. As illustrated in FIG. 7, the wearable electronic device 100 comprises lights sources L_1-L_4 and image sensors IS_1-IS_4. The image sensors IS_1-IS_4 are provided at a center of the wearable electronic device 100. Also, the lights sources L_1-L_4 are respectively provided between the edge of the first region R1 and the first electrodes T_11-T_14. The image sensors IS_1-IS_4 can capture images (or named light sensing signal) based on the light generated by the lights sources L_1-L_4. Also, the processing circuit 101 can calculate biological information according to the images. Further, in one embodiment, the processing circuit 103 calibrates the light sensing signal according to the wearing location or the wearing angle. For example, if the wearing location or the wearing angle means that the skin SW firmly touches the first electrode T_11 but does not touch the first electrode T_14, a higher weighting is provided to the light sensing signal sensed by the image sensor IS_1 and a lower weighting is provided to the light sensing signal sensed by the image sensor IS_4. In one words, the processing circuit 103 further determines which one of the light sensing signals is reliable according to the wearing location or the wearing angle.

In view of above-mentioned embodiments, the wearable electronic device provided by the present invention can be illustrated as: a wearable electronic device with a function of detecting a wearing state, comprising: a processing circuit 103, configured to receive a first group of touch sensing signal and a second group of touch sensing signal. The first group of touch sensing signal can mean the signals which the first electrodes T_11-T_14 generate responding to the driving signals generated by the capacitance calculating circuit 103. Also, the second group of touch sensing signal can mean the signals which the second electrodes T_21-T_24 generate responding to the driving signals generated by the capacitance calculating circuit 103.

The first group of touch sensing signal comprises a plurality of first touch sensing signals and the second group of touch sensing signal comprises at least one second touch sensing signal. That is, a number of the first electrodes T_11-T_14 can be more than one. Also, a number of the second electrodes T_21-T_24 can be one or more than one. Each one of the second touch sensing signal respectively corresponds to one specific touch sensing signal of the first touch sensing signals. In one embodiment, the specific touch sensing signal is generated by one of the first electrodes which is closest to the second electrode corresponding to the specific touch sensing signal. For example, in the embodiment of FIG. 1, the specific touch sensing signal corresponding to the second electrode T_21 is generated by the first electrode T_11, which is the first electrode closest to the second electrode T_21. Also, the processing circuit 103 determines a wearing location or a wearing angle of the wearable electronic device according to differences between the first touch sensing signals (e.g. first capacitance variation). Besides, the processing circuit 103 determines the wearing state according to differences between the first touch sensing signals and the second touch sensing signals (e.g. capacitance difference between the first capacitance and the second capacitance).

Also, the processing circuit 103 determines whether the wearable electronic device has the worn state or the taken off state according to whether the difference between the first touch sensing signals and the second touch sensing signals exceed a difference threshold. The difference threshold for determining the worn state and the taken off state is larger than the differences between the first sensing signals. That is, the processing circuit 103 determines whether wearable electronic device has the worn state or the taken off state based on whether the first capacitance and the second capacitance has a large capacitance difference. Also, the processing circuit 103 determines the wear location or the wear angle based on smaller first capacitance variation. By this way, the processing circuit 103 can clearly determine the worn state and the taken off state, and can clearly determine the wear location or the wear angle.

In view of above-mentioned embodiments, a wearing state, a wearing location, a wearing angle of the electronic device can be detected via electrodes of the electronic device, thus the problem caused by an improper wearing manner can be improved. Also, the present invention provides a more strict security mechanism according to the wearing state.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with a function of detecting a touch state, comprising:
   a front surface, configured to show images;
   at least one first electrode, provided in a first region of the electronic device;
   at least one second electrode, provided in a second region of the electronic device, wherein a distance between the first region and the front surface is larger than a distance between the second region and the front surface;
   a capacitance calculating circuit, coupled to the first electrode to calculate at least one first capacitance generated by the first electrode and coupled to the second electrode to calculate at least one second capacitance generated by the second electrode, wherein the capacitance calculating circuit further calculates a capacitance difference between the first capacitance and the second capacitance; and
   a processing circuit, coupled to the capacitance calculating circuit, configured to determine the touch state and a wearing state according to the capacitance difference;
   wherein the wearing state comprises a worn state and a taken off state, wherein the processing circuit further determines the wearing state is in the worn state if the capacitance difference is larger than a capacitance difference threshold, and determines the wearing state is in the taken off state if the capacitance difference is smaller than the capacitance difference threshold.

2. The electronic device of claim 1, wherein the electronic device comprises an inner region serving as the first region and an outer region serving as the second region.

3. The electronic device of claim 2, wherein the outer region is surrounding the inner region.

4. The electronic device of claim 2, wherein the inner region is provided to a first part of the electronic device and the outer region is provided to a second part of the electronic device, wherein the inner region and the outer region are provided to a first surface of the electronic device, wherein the first part is more protruding than the front surface of the electronic device, wherein the front surface is opposite to the first surface.

5. The electronic device of claim 1, further comprising:
   at least two light sources and at least one optical sensor, wherein the optical sensor senses light generated from the light sources to respectively generate light sensing signals;
   wherein the capacitance calculating circuit further calculates a first capacitance variation based on the first capacitance and a second capacitance variation based on the second capacitance;
   wherein the processing circuit further determines which one of the light sensing signals is reliable according to the first capacitance variation or the second capacitance variation.

6. The electronic device of claim 1, wherein at least one of the first electrode serves as at least one transmitter and at least one of the first electrode serves as at least one receiver, wherein the processing circuit further calculates biological information according to signals flowing between the transmitter and the receiver.

7. An electronic device with a function of detecting a touch state, comprising:
   a front surface, configured to show images;
   at least one first electrode, provided in a first region of the electronic device;
   at least one second electrode, provided in a second region of the electronic device, wherein a distance between the first region and the front surface is larger than a distance between the second region and the front surface;
   a capacitance calculating circuit, coupled to the first electrode to calculate at least one first capacitance generated by the first electrode and coupled to the second electrode to calculate at least one second capacitance generated by the second electrode, wherein the capacitance calculating circuit further calculates a capacitance difference between the first capacitance and the second capacitance;
   a processing circuit, coupled to the capacitance calculating circuit, configured to determine the touch state according to the capacitance difference; and
   at least two light sources and at least one optical sensor, wherein the optical sensor senses light generated from the light sources to respectively generate light sensing signals;
   wherein the capacitance calculating circuit further calculates a first capacitance variation based on the first capacitance and a second capacitance variation based on the second capacitance;
   wherein the processing circuit further determines which one of the light sensing signals is reliable according to the first capacitance variation or the second capacitance variation.

* * * * *